United States Patent
Jeltsch et al.

[11] Patent Number: 6,021,816
[45] Date of Patent: Feb. 8, 2000

[54] CORRUGATED PIPE

[75] Inventors: Thomas Jeltsch, Domat/Ems; Jürgen Brueggemann, Chur, both of Switzerland

[73] Assignee: Ems-Inventa AG, Zurich, Switzerland

[21] Appl. No.: 09/030,179

[22] Filed: Feb. 25, 1998

[30] Foreign Application Priority Data

Feb. 25, 1997 [DE] Germany .................. 197 07 518

[51] Int. Cl.$^7$ ........................................ F16L 11/11
[52] U.S. Cl. ................ 138/121; 428/36.9; 138/109; 138/122
[58] Field of Search ................ 138/121, 122, 138/109; 428/36.9; 454/119

[56] References Cited

U.S. PATENT DOCUMENTS

| | | | | |
|---|---|---|---|---|
| 5,305,799 | 4/1994 | Dal Palu | ................ | 138/109 |
| 5,316,047 | 5/1994 | Kanao | ................ | 138/121 |
| 5,429,397 | 7/1995 | Kanao | ................ | 138/121 |
| 5,720,656 | 2/1998 | Savage | ................ | 454/119 |
| 5,792,532 | 9/1995 | Pfleger | ................ | 138/121 |

FOREIGN PATENT DOCUMENTS 1 171 563   6/1964   Germany .

*Primary Examiner*—Andres Kashnikow
*Assistant Examiner*—Davis Hwu
*Attorney, Agent, or Firm*—Hardaway/Mann IP Group

[57] ABSTRACT

The invention relates to a corrugated pipe of thermoplastic polymer material for use as fluid line with at least one polymer layer, comprising closed geometric outer contours which are spaced at an interval from each other in the axial direction of the pipe and which define a corrugation on the pipe jacket in at least one radial angular sector in axial, longitudinal direction one behind the other. The closed geometric outer contours are designed in such a manner that two jacket lines of the pipe jacket surface, which lines are approximately opposite one another, are free of corrugations and that these jacket lines extend in the longitudinal direction of the pipe (FIGS. 1b–1d).

21 Claims, 4 Drawing Sheets

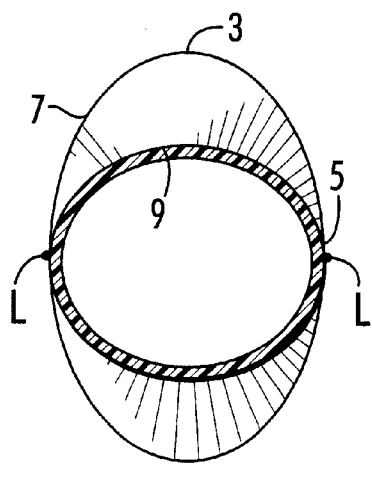
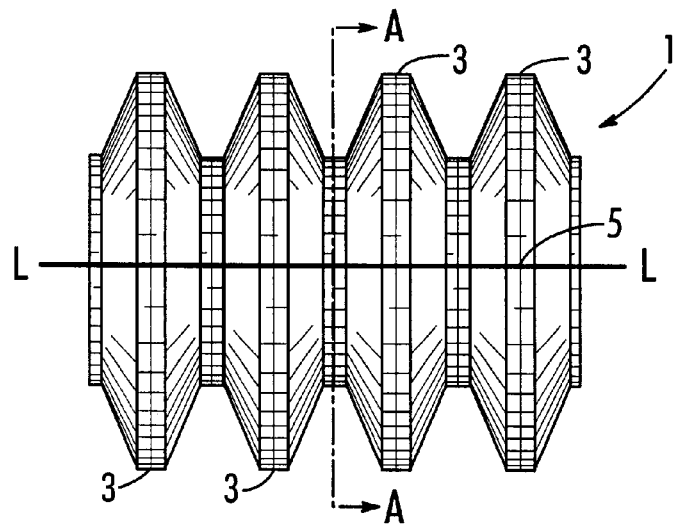
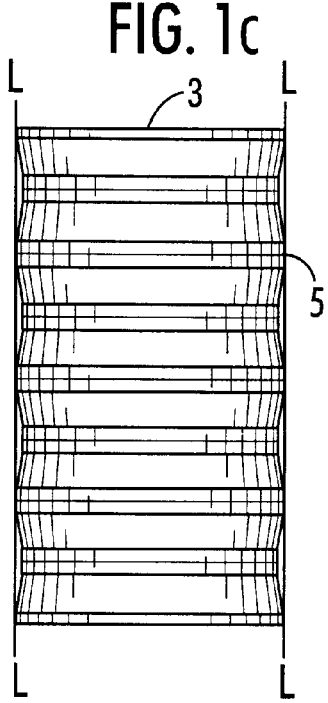
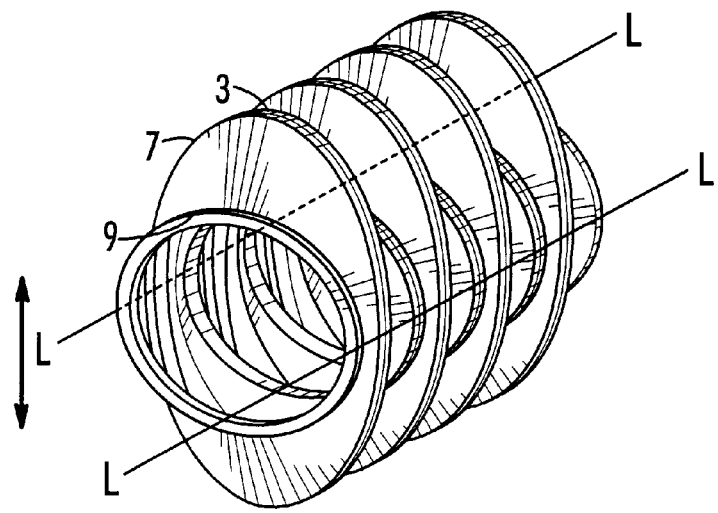

FIG. 2A
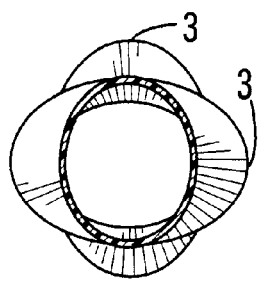
FIG. 2B
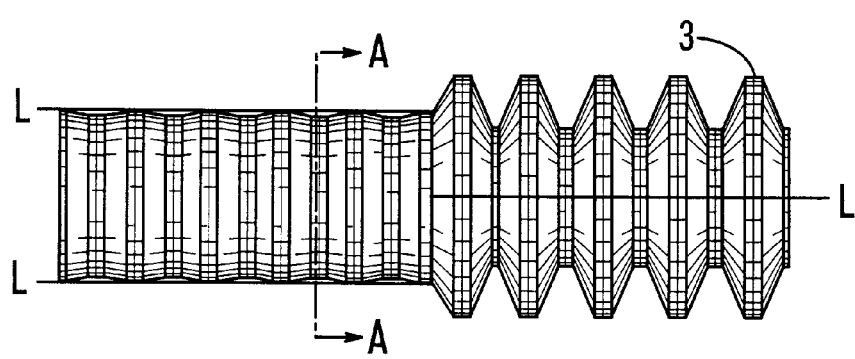
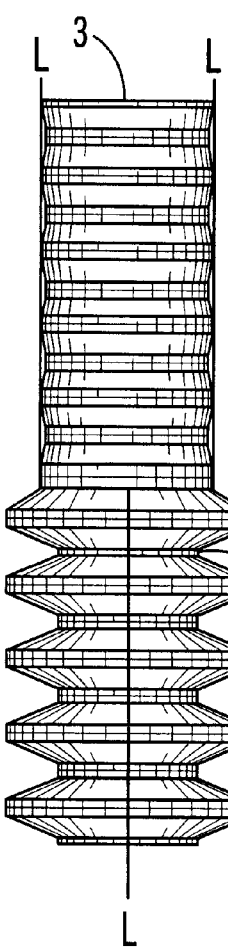
FIG. 2D
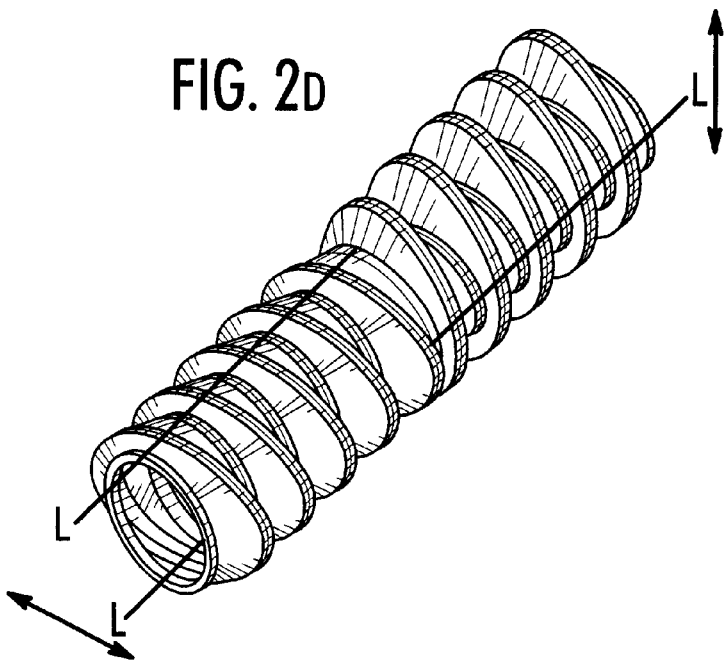
FIG. 2C

CORRUGATED PIPE

SUMMARY OF INVENTION

The invention relates to a corrugated pipe of thermoplastic polymer material for use as fluid line with at least one polymer layer, comprising closed geometric outer contours which are spaced at an interval from each other in the axial direction of the pipe and which define a corrugation on the pipe jacket in at least one radial angular sector in axial, longitudinal direction. The outer contours are protruding radially, at least partly. Especially preferred applications of corrugated pipes of the present invention are in the automobile sector for realizing liquid lines and air-conduction parts. A related German Application 197 07 518.5-24, filed with the German Patent Office on Feb. 25, 1997, is incorporated herein by reference.

BACKGROUND OF THE INVENTION

Various types of corrugated pipe are known such as that described in DE 44 32 584 C1, which stems from the same applicant and in which the outer contours are designed as flattened or segmentally enlarged circles. In this embodiment the corrugations extend over all radial angular sectors in the longitudinal direction of the pipe. This results in the disadvantages explained below.

Other embodiments of corrugated pipes result from EP 0 671 582 A1; DE 43 21 575 C1 and GB 1 209 569. These known embodiments of corrugated pipes all contain outer contours which assure a wave line in all radial angular sectors on the pipe jacket surface.

Traditionally, air-conduction parts and liquid lines, e.g. coolant lines, are preferably manufactured out of rubber pipes and rubber hoses reinforced with textiles. Pipes and hoses of thermoplastic plastics offer considerable savings of expense and weight and have, in addition, an improved recycling potential. In this material substitution a bending flexibility comparable to that of rubber pipes is required from the thermoplastic pipes.

The greater material stiffness of the relevant thermoplastics can be compensated for by a corrugated structure of the pipe jacket surface. This geometry, known as corrugated pipe, is known in various embodiments. However, the bending flexibility achieved therewith makes the tensile stiffness worse, i.e., a greater expansion in longitudinal direction of the pipe upon tension must be accepted. Corrugated pipe geometries resulting in an increase of the tensile stiffness are known from the above-named publications.

However, all these embodiments have the problem, explained in detail below, of the coupling of tensile stiffness and bending stiffness.

Especially in the case of air-conduction parts and coolant lines in the automobile sector a high bending flexibility is required in addition to a high resistance to inner pressure in order to be able to create a tolerance compensation in connections between movable structural parts and in order to facilitate assembly.

When a corrugated pipe is selected, a tensile flexibility and compression flexibility of the pipe is achieved by the surface corrugated in the longitudinal direction of the pipe which is far greater than that of a pipe with a smooth surface.

A tensile deformation or compressive deformation occurring in a straight line in the longitudinal direction of the pipe is taken up in the wall of the corrugated pipe by uniformly distributed bending deformations in the individual profile corrugations.

In a bending deformation (curvature) of an entire corrugated pipe the mean casing surface of the pipe wall, which can be imagined as hose-shaped, is stretched on the side with the greater radius of curvature (outside) and is compressed on the side with the smaller radius of curvature (inside), according to its distance from and its position relative to the curved neutral plane (plane without tensile or compressive tension), in which the curved pipe axis runs.

The stretching and compressing is made possible analogously to the deformations in a tensile loading/compressive loading by bending deformation (pulling apart or compressing) of the corrugations. The plane in which the bending takes place is designated thereby as the bending plane. It therefore stands perpendicularly on the neutral plane and is not bent itself.

Thus, since the same deformation mechanisms apply to a bending deformation and a tensile or compressive deformation of a corrugated pipe in the corrugated profile, tensile stiffness/compressive stiffness and bending stiffness are mechanically coupled for traditional corrugated pipes. This means that a conventional bending-soft corrugated pipe is also automatically tension-soft and pressure-soft.

The loading of a pipe, whether smooth or corrugated, by inner pressure acts via the force of pressure on the contour of the inner pipe cross section like a tensile force applied from the outside. This means for traditional, bending-soft corrugated pipes with low tensile stiffness that as a result of the mechanical coupling of the stiffness the inner pressure loading results in a strong change in length of the pipe.

This results in particular in problems for the use of corrugated pipelines with fluctuating pressure load like those which typically occur with air-conduction parts and coolant lines in the automobile sector but also in water lines of washing machines. The changes in length occurring as a result of the variations in pressure often collide with restrictions of the possible mounting space. The alternating bending stress occurring in the profile corrugations constitutes an additional strain on the material and thus reduces the attainable service life.

DE 43 21 575 C1 describes a corrugated pipe provided for use as fluid line in which the corrugations are designed eccentrically in certain longitudinal sections, which do not run vertically after the subsequent mounting in a motor vehicle, in such a manner that the area of the pipe wall which is later on the bottom is internally free of corrugations. This solves the basic problem of making available a corrugated pipe in which no liquids or condensation water can collect in the corrugation valleys. However, the corrugation-free sectors are only one-sided and not continuous and such lines are not suited for being loaded with pressure on account of the low tensile stiffness but are only suitable for unpressurized ventilation pipes.

U.S. Pat. No. 4,592,231 describes a corrugated pipe which functions as a protective pipe for a conductive foil in an electric level measuring device for liquid containers (e.g. gasoline tanks). The problem here was to develop a measuring sensor with maximal bending capacity in all directions for inaccessible, curved container geometries in order to be able to follow down to the lowest point even in irregular tank shapes of the container construction. This was achieved by a conductive foil which comprises indentations on both sides over the entire length and can as a result be rotated about its longitudinal axis and bent in all directions without fraying or tearing. In order that the protective pipe, which must also be flexible, could serve at the same time as a holder for the foil it was designed as a corrugated pipe in which the corrugations are opposingly interrupted, which interruptions are located on two helical lines. In this manner the foil was able to be simply inserted into the corrugated pipe and was held there in the desired, helically rotated form. However, the non-corrugated sectors have a function which is quite different in comparison to the present invention and have no relationship to a desired reinforcement of the corrugated pipe because in this measuring device just the opposite, to wit, maximal flexibility, was required. In addition, the design of the protective pipe is unsuited for pressure-loaded lines because the protective pipe according to U.S. Pat. No. 4,592,231 has no fluid flowing through it nor is there a difference in pressure between the interior area of the pipe and the ambient surroundings. The use of this geometry for lines with the initially described problem through which fluid passes and which stand under inner pressure is not rendered obvious by U.S. Pat. No. 4,592,231 because it discusses neither the longitudinal stability of the pipe nor the relationship between bending stiffness and tensile stiffness.

DE-AS 1171563, which relates to the area of medicine, describes a rubber corrugated hose for anesthesia apparatuses and respirators in which the longitudinal expansion upon elevated internal gas pressure is avoided by a corrugated hose design comprising a plane partition wall in the middle and extending in longitudinal direction. It is therefore a hose with two lumens which is corrugated roundabout. Since just the plane partition wall receives the forces of longitudinal expansion this solution has the disadvantage that it is bound to the additional partition wall and can thus only be considered where a two-lumen hose is required, which is seldom the case in many industrial areas.

BRIEF DESCRIPTION OF THE FIGURES

FIG. 1a is a cross-section through a corrugated pipe taken along line A—A as seen in FIG. 1b.

FIG. 1b is a side elevation of a first embodiment of the present invention.

FIG. 1c is a plan view of the corrugated pipe embodiment seen in FIG. 1b.

FIG. 1d is a side perspective view of the corrugated pipe seen in FIG. 1b.

FIG. 2a is a cross-section taken along line A—A of FIG. 2b.

FIG. 2b is a side elevation of a second embodiment of a corrugated pipe having angularly offset regions of non-corrugation.

FIG. 2c is a plan view of the embodiment seen in FIG. 2b.

FIG. 2d is a side perspective view the embodiment seen in FIG. 2b.

DETAILED DESCRIPTION

Figure 3D:
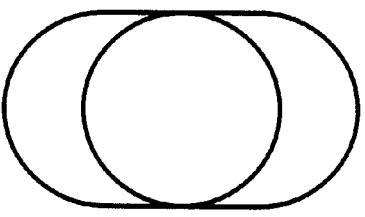
FIGS. 3a–3h illustrate cross-section of possible combinations of closed-figure shapes for the innermost pipe contour and the outermost pipe contour for alternative embodiments of corrugated pipe in accordance with this invention.
Figure 3C:
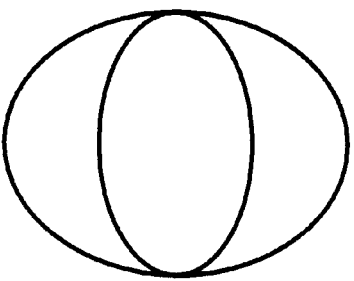
Figure 3B:
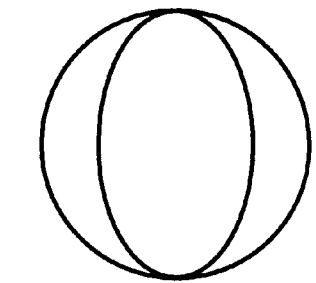
Figure 3A:
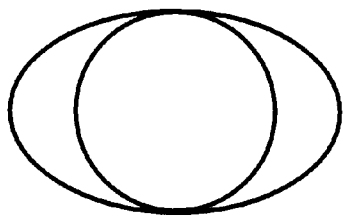
Figure 3H:
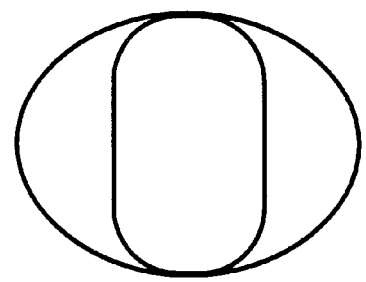
Figure 3G:
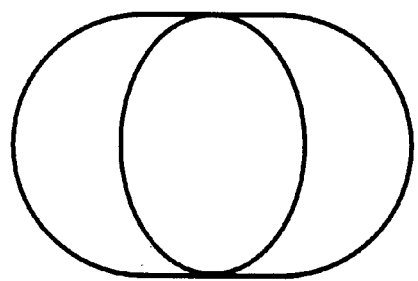
Figure 3F:
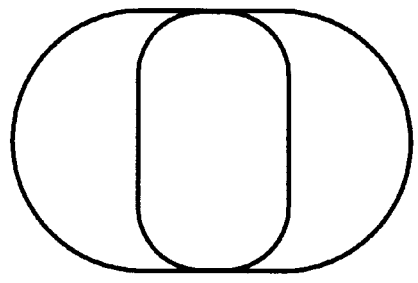
Figure 3E:
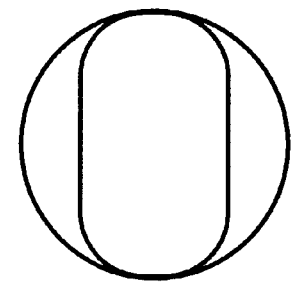

The object of the present invention is to create a pressure-loadable, single-lumen corrugated pipe with high bending flexibility and high bursting-pressure strength which requires no additional reinforcing means and exhibits only a slight longitudinal expansion upon being loaded with pressure.

The problem is solved by a corrugated pipe of thermoplastic polymer material for use as fluid line with at least one polymer layer, comprising closed geometric outer contours which are spaced at an interval from each other in the axial direction of the pipe and which define a corrugation on the pipe jacket in at least one radial angular sector in axial, longitudinal direction one behind the other, characterized in that the closed geometric outer contours are designed in such a manner that two jacket lines of the pipe jacket surface, which lines are approximately opposite one another, are free of corrugations and that these jacket lines extend in the longitudinal direction of the pipe. Advantageous embodiments result from the additional embodiment set forth below.

As seen in the reference to FIGS. 1a–1c, a first embodiment is corrugated pipe 1 having an exterior surface with a plurality of corrugated regions 3. The corrugated regions 3 increase to a maximum outer circumference as seen along the uppermost and lowermost edges of FIG. 1b and decrease in a cross-sectional diameter to edges 5 where no corrugation is present.

Line L—L in FIGS. 1a–1d represents a jacket line of corrugation-free sectors which presents an entirely smooth surface along the surface of the axial length represented by line L—L.

As seen in FIG. 1a, the outer contour 7 of the corrugated profile is in elliptical shape. Similarly, the outer contour 9 is also elliptical.

The outer contours of the corrugated pipe are designed so that a corrugation of the pipe is completely eliminated in two approximately opposite sectors on the pipe-jacket surface. Of course, the inner contour of the corrugated pipe is, after subtracting the wall thickness, a reproduction of the outer contour. The sectors without corrugation are continuous in the longitudinal direction of the pipe and can in principle have the shape of any desired curve. They are preferably arranged uninterruptedly in a straight line, helically or sector-wise in a straight line in alternating angular positions. It is especially preferred if the corrugation-free jacket lines (generating surface lines) are straight, that is, axially parallel, because this results, in comparison to the helical geometry, which slackens under a tensile stress, in a greater tensile stiffness, that is, in even better longitudinal stability.

The corrugation-free sectors are preferably opposite each other at an angle of 150–210°. This angle is especially preferably 180°.

The corrugated pipe behaves in the sectors without corrugation like a smooth pipe. It can not yield, under tensile or compressive loading, due to bending deformation as in the corrugated sectors.

In contrast to conventional corrugated-pipe profiles the bending flexibility of the corrugated pipe in this novel geometry is a function of the radial circumferential angle. The corrugated pipe has its maximum bending stiffness, that is, minimal bending flexibility, in a bending plane which intersects the sectors without corrugation. In a bending plane perpendicular to the plane of maximal bending stiffness the bending stiffness is preferably minimal, that is, the bending flexibility is maximal.

If the corrugated pipe is bent in the plane of minimal bending stiffness the sectors without corrugation are located in the so-called neutral bending grain. That is, almost no stretchings or compressions occur in these sectors whereas at the same time, viewed at a circumferential angle rotated by 90°, the corrugations yield to the maximum extent to the bending (due to expansion or compression).

A decoupling of the bending stiffness and of the tensile stiffness is achieved with the geometry of the outer contours defined in accordance with the invention. In particular, a corrugated pipe can be manufactured with this geometry which has a very great longitudinal stiffness, i.e., a lower longitudinal deformation of the pipe upon tensile or compressive load, and nevertheless has a very good bending flexibility in one bending plane.

Corrugated pipes with longitudinal sectors without corrugations are not totally unknown; however, such corrugated pipes concerned completely different problems and different industrial applications.

The present invention permits numerous embodiments.

In FIGS. 1d and 2d the planes with the greatest bending flexibility are indicated by double arrows.

Preferred geometries for the rings formed by the corrugation are ellipses, ovals and circles, all of which can also comprise flattened areas, as well as are so-called oblong holes.

It is especially preferred if the rings formed by the contours are arranged concentrically about the pipe axis, that is, in such a manner that the intersections of their axis or their central point are located on the pipe axis.

An especially advantageous design of the corrugated-pipe profile in accordance with the invention results if the outer contours of the small and of the large cross section (9 and 7 in FIG. 1a) are designed in an elliptical form. In this instance the large semiaxis of the small cross section 9 is parallel to and of the same size as the small semiaxis of the large contour cross section 7. The property that non-circular cross sections tend to deform under internal pressure to circular cross sections can be utilized for mutual compensation of this tendency by an alternating 90° rotation of adjacent elliptical cross sections.

The general instance for the application of a corrugated-pipe geometry frequently requires a high bending flexibility in more than one bending plane. This property is achieved in that at least two sections of the corrugated-pipe geometry of the invention are series-connected with an adapted, different alignment of the planes of minimal bending strength (see FIG. 2). The series-connecting of two bending elements at a defined angle, e.g., 90°, each of which elements permits a bending in only one plane, makes possible any desired mobility of one of the two ends within a certain spatial angle. In this manner a practically unlimited mobility can be achieved for the corrugated pipe of the invention, viewed as a whole, even though a degree of freedom must be sacrificed in each individual section in favor of the increased tensile stiffness. Other offset angles than 90° can also be advantageous, as a function of the required bending planes depending on the assembly conditions, which offset angles can be adapted tailored section by section. The offset angle is preferably in a range of 20–160°. Care is to be taken when designing the transition from one section to the next that even here an uninterrupted, corrugation-free connection in the form of a ring, that is, of a short, straight pipe section, is created in which the corrugation-free jacket lines of the one section end and the next ones, rotated by the angle, continue in order that the sections are continuously composed without the weak spot of a corrugation or constriction.

Figure 4A:
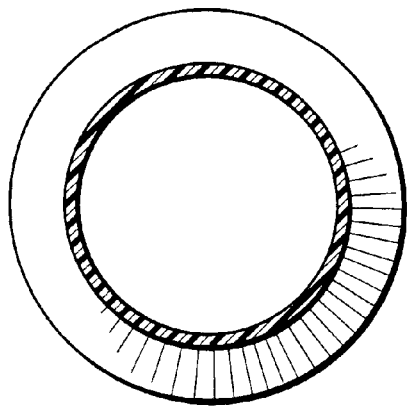
FIG. 4a is a cross-section view of a prior art corrugated pipe as taken along line A—A of FIG. 4b.
Figure 4B:
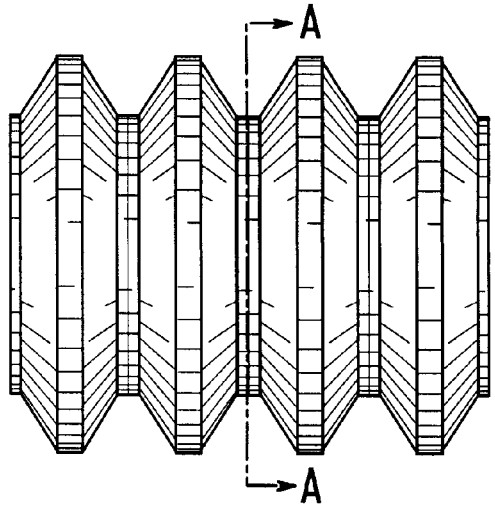
FIG. 4b is a side elevation of a prior art corrugated pipe.
Figure 4C:
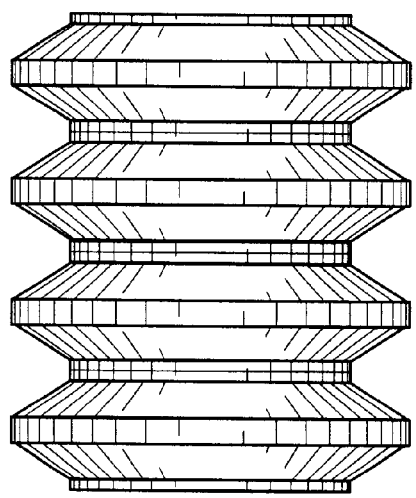
FIG. 4c is a top planned view of the prior art pipe seen in FIG. 4b.
Figure 4D:
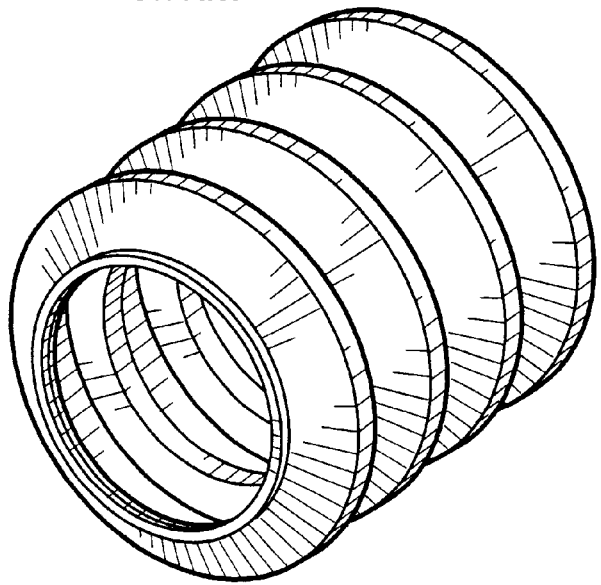
FIG. 4d is a side perspective view of the prior art pipe seen in FIG. 4b.

In order to be able to quantify the effect of the novel corrugated pipe geometry the corrugated-pipe profile of the invention shown in FIGS. 1a–1d was compared by means of finite element analysis with a conventional, symmetric, circular corrugated-pipe profile in accordance with FIGS. 4a–4d. The geometry of the two comparison profiles was selected in such a manner that the free flowthrough cross sections and the average wall thicknesses corresponded to one another. A polymer material with 100 MPa isotropic material stiffness was assumed for the calculation. Loads were simulated on both profiles which represent typical operating conditions for air-conduction parts and coolant lines in the automobile sector.

In load case A 2 bar internal pressure (differential pressure) were applied and in load case B a bending deformation of 5° per 20 mm profile length was applied in addition to the internal pressure. The following table 1 shows in particular the difference in the resulting longitudinal expansion caused by the internal pressure and shows the so-called reduced stresses (von Mieses stresses) occurring maximally in load case B.

TABLE 1

| Property | (Unit) | Conventional corrugated pipe (FIG. 4) | Corrugated pipe in accordance with the invention (FIG. 1) |
|---|---|---|---|
| Flowthrough cross section | (mm$^2$) | 1050 | 1050 |
| Average wall thickness | (mm) | 1.5 | 1.5 |
| Bending stiffness | (Nmm$^2$/rad) | $5.0 \cdot 10^5$ | $4.3 \cdot 10^5$ *) |
| Longitudinal expansion under 2 bar internal pressure | (%) | 11.0 | 2.5 |
| Maximum reduced stress under 2 bar internal pressure and 5° bending deformation per 20 mm profile length | (MPa) | 13 | 10 |

*) In the plane of greatest bending flexibility

The corrugated pipe of the invention displays clear advantages for all three criteria, that is, greater flexibility and yet a longitudinal expansion which is distinctly smaller, even by factors, and displays less maximal reduced stress (von Mieses stress). These advantages are also present compared to the corrugated pipes of the state of the art which are reinforced with ribs or otherwise modified and which are to be ranked between the conventional corrugated pipe and that of the invention of table 1.

The polymer corrugated pipes of the invention can be built up with one, two or several layers of material. A preferred method of manufacture is extrusion or co-extrusion with subsequent suction molding or blow molding in order to form the geometry of the invention. Other preferred methods are extrusion blow molding, co-extrusion blow molding and sequential blow molding, each with or without hose manipulation.

Basically, any thermoplastic polymers can be used to manufacture the corrugated pipe of the invention. Preferred polymers or polymer combinations are described in EP 0 671 582 A1 and DE 44 32 584 C1, both of which are from the same applicant and whose disclosure is expressly included here.

That which is claimed is:

1. A corrugated pipe of thermoplastic polymer material for use as fluid line with at least one polymer layer, comprising closed geometric outer contours which are spaced at an interval from each other in the axial direction of the pipe and which define a corrugation on the pipe jacket in at least one radial angular sector in axial, longitudinal direction one behind the other, characterized in that the closed geometric outer contours are designed in such a manner that two jacket lines of the pipe jacket surface, which lines are approximately opposite one another, are free of corrugations and that these jacket lines extend in the longitudinal direction of the pipe.

2. The corrugated pipe according to claim 1, characterized in that the corrugation-free jacket lines are opposite each other at an angle of 150–210° and especially preferably at an angle of 180°.

3. The corrugated pipe according to claim 1, characterized in that the two corrugation-free jacket lines run uninterruptedly in a straight line and are parallel to the pipe axis.

4. The corrugated pipe according to claim 1, characterized in that the two corrugation-free jacket lines are arranged in at least two axially successive sections of the corrugated pipe in different radial angular sections.

5. The corrugated pipe according to claim 1, characterized in that the two corrugation-free jacket lines run helically about the pipe axis.

6. The corrugated pipe according to claim 1, characterized in that the outer contours forming the corrugations have the form of ellipses, ovals, circles or oblong holes and are optionally flattened in individual sectors.

7. The corrugated pipe according to claim 6, characterized in that the outer contours forming the corrugations are arranged concentrically to the pipe axis.

8. The corrugated pipe according to claim 6, characterized in that when the outer contours are designed as ellipses the large semi-axis of the small cross section is parallel to and of the same size as the small semi-axis of the large contour cross section.

9. The corrugated pipe according to claim 4, characterized in that the corrugation-free jacket-line pairs following each other in successive fashion are rotated by 20–160° relative to each other.

10. The corrugated pipe according to claim 1 which can be manufactured by extrusion or co-extrusion with subsequent suction molding or blow molding as well as by extrusion blow molding, co-extrusion blow molding or sequential blow molding with or without hose manipulation.

11. The use of corrugated pipes according to claim 1 for air-conduction parts and liquid lines in automobiles or as water lines for washing machines.

12. The corrugated pipe according to claim 2 characterized in that the two corrugation-free jacket lines run uninterruptedly in straight a line and are parallel to the pipe axis.

13. The corrugated pipe according to claim 2 characterized in that the two corrugation-free jacket lines are arranged in at least two axially successive sections of the corrugated pipe in different radial angular sections.

14. The corrugated pipe according to claim 2 characterized in that the two corrugation-free jacket lines run helically about the pipe axis.

15. The corrugated pipe according to claim 2 characterized in that the outer contours forming the corrugations have the form elipses, ovals, circles, or oblong holes and are optionally flattened in individual sectors.

16. The corrugated pipe according to claim 4 characterized in that the outer contours forming the corrugations have the form of ellipses, ovals, circles, or oblong holes and are optionally flattened in individual sectors.

17. The corrugated pipe according to claim 7 characterized in that when the outer contours are designed as a ellipses the large semi-axis of the small cross-section is parallel to and of the same size as the small semi-axis of the large contour cross-section.

18. The corrugated pipe according to claim 6 which can be manufactured by extrusion or coextrusion with subsequent suction molding or blow molding as well by extrusion blow molding, co-extrusion blow forming or sequential blow molding with or without hose manipulation.

19. A corrugated pipe comprising:

a thermoplastic polymer tube having at least one polymer layer, said tube defining a plurality of closed geometric outer contours which define a corrugation on the pipe surface;

said pipe surface further defining a first jacket line and a second jacket line, said jacket lines approximately opposite one another, which are free of corrugation and which extend in the longitudinal direction of the pipe.

20. A conduit comprising:

a thermoplastic pipe defining a wall having a plurality of corrugations, said wall further defining a first continuous portion of non-corrugated pipe wall, said portion extending from a first end of a pipe section to a second end of said pipe section and in an axial direction;

a second continous portion of non-corrugated pipe wall, said second portion connecting a first end of said pipe section to a second end of said pipe section, said first portion maintaining a complimentary pattern and spacing relative to said second portion.

21. The conduit according to claim 20 wherein said conduit has a first pipe section having a first orientation of a non-corrugated pipe wall portion, said first pipe section in fluid communication with a second pipe section, said second pipe section having a second orientation of a non-corrugated pipe wall portion different from said first orientation.

* * * * *